United States Patent [19]

Phillips

[11] 3,822,616
[45] July 9, 1974

[54] NUT DRIVER
[75] Inventor: Ruben Verldon Phillips, Mason, Ohio
[73] Assignee: Cincinnati Milacron Inc., Cincinnati, Ohio
[22] Filed: Feb. 23, 1973
[21] Appl. No.: 334,987

[52] U.S. Cl............................................. 81/90 C
[51] Int. Cl......................................... B25b 13/48
[58] Field of Search................ 81/90 C, 90 R, 90 D

[56] References Cited
UNITED STATES PATENTS
2,689,495   9/1954   Schofield...................... 81/90 D X
3,489,041   1/1970   Hauenstein et al. ............... 81/90 R
3,760,659   9/1973   Campbell........................... 81/90 C FOREIGN PATENTS OR APPLICATIONS
491,107   2/1930   Germany............................ 81/90 C Primary Examiner—Al Lawrence Smith
Assistant Examiner—James G. Smith

[57] ABSTRACT

A tool for driving a notched ring nut to secure a device to a panel, with means for preventing lateral slippage of the tool while turning the same during engagement of the tool in notches of the notched nut having a clearance region providing clearance for internal interference of a projection on the device.

1 Claim, 7 Drawing Figures

PATENTED JUL 9 1974    3,822,616

NUT DRIVER

BACKGROUND OF THE INVENTION

This invention is related generally to nut drivers and more specifically to tools for driving notched ring nuts. In the past, where a notched ring nut is utilized to secure a device to a panel, for example, push buttons or display devices protruding through a clearance hole and secured by tightening a notched ring nut down to hold the device in place with respect to the panel, various spanner wrenches or the like have been utilized to drive the ring nut. Generally, the nut driver is of the type having a cylindrical shaft with ears on the end portion. The ears are suited to engage said notches thereby permitting tightening of the nut by turning said shaft in much the same manner as a screw driver rotates a screw. Various embodiments of the nut driver type tool contain an apparatus which fits inside the inner diameter of the ring nut when the tool ears are engaged in the ring nut notches, thereby prohibiting lateral shift of the tool while applying a rotating drive force. When used to secure devices with projections, such as push buttons or toggle switches, a nut driver as described above with an apparatus prohibiting lateral shift cannot be used because the projection interferes with operation of the lateral shift prohibiting apparatus.

The present invention is designed to alleviate this interference problem by providing an apparatus on the nut driver for prohibiting lateral shift, having a clearance region for receipt of projections on the device being mounted. The present invention, therefore, permits the use of a nut driver type tool having an apparatus for prohibiting lateral shift, for securing devices with projections to panels.

SUMMARY OF THE INVENTION

The present invention comprises a cylindrical, hollow shaft with ears on the end portion thereof for engaging the rings. The shaft contains a smaller cylinder designed to fit inside the internal diameter of the ring nut, whereby engagement of the ears in the notches of the ring nut is assured by placing the cylindrical shaft within the inner diameter of said ring nut.

It is, therefore, an object of the present invention to provide a means for tightening a notched ring nut to a mounting panel while providing means for preventing lateral slippage of the driver.

It is a further object of the present invention to provide a clearance region within said means for preventing lateral slippage of the driver, for clearance of projections on devices being secured to a mounting panel. Other objects and features will be readily apparent from the attached drawings and description.

While a detailed description of an exemplary embodiment of the nut driver is contained in the drawings and following description, it is to be understood that any modifications may be made in structural details here shown and described, within the scope of the appended claims, without departing or exceeding from the spirit and scope of the invention.

THE DRAWINGS

DETAILED DESCRIPTION

Figure 1:
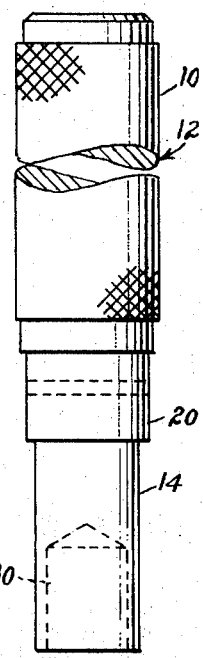
FIG. 1 illustrates the internal cylindrical shaft designed to fit inside the internal diameter of the ring nut.
Figure 2:
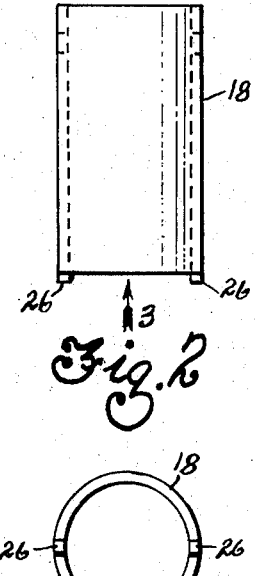
FIG. 2 is an illustration of the hollow cylindrical shaft having ears contained in one end thereof for engaging the notches of said ring nut.
Figure 4:
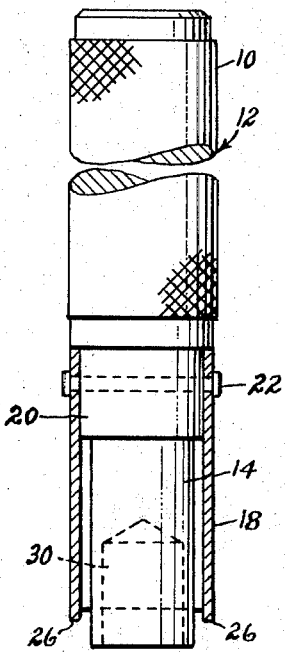
FIG. 4 is an illustration of the assembled nut driver.
Figure 3:
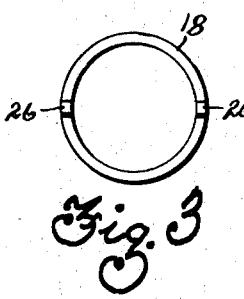
FIG. 3 is a view looking in the direction of the arrow 3 in FIG. 2, showing the end face of said hollow cylinder containing the ears.

In FIG. 1 there is shown a knurled handle 10 for turning the nut driver or similar device. In the illustrated embodiment the handle is part of stepped cylindrical shaft 12 wherein there is a cylindrical stepped portion 14 on one end of the shaft 12 suited to fit inside the ring nut 16 shown in FIGS. 5, 6 and 7. Secured to the shaft 12 and enveloping the stepped portion 14 is a hollow cylinder 18, shown in FIG. 2. The cylinder 18 is designed to fit over the stepped shaft 14 and onto the mounting step 20 of the stepped cylindrical shaft 12. The cylinder may be permanently secured to the mounting step 20 by the pin 22, as shown in FIG. 4 or any other suitable device. Ears 26 on the end of the hollow cylinder are designed to engage the notches 28 of the ring 16, see FIGS. 5, 6 and 7. In this manner, it is possible to tighten the ring 16 by rotating the handle 10. As best illustrated in FIG. 4, the stepped portion of the shaft 14 extends beyond the ears 26 thus providing a guide for the tool when engaging the ears 26 in the notches 28 of the ring 16. As illustrated in FIGS. 1, 4 and 7, shaft 14 contains a clearance region 30 providing clearance for internal interference of the push button, toggle switch, or other projection on the device being mounted. Clearance region 30 may be any size and shape dependent upon the size and shape of the projection on the device being mounted.

Figure 5:
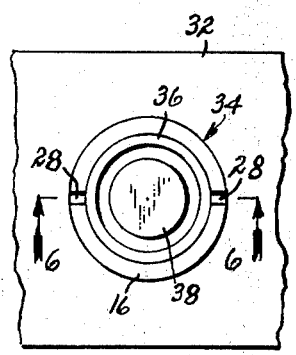
FIG. 5 is an elevational view of a mounting panel having a push button or similar device secured thereto.

A typical mounting plate 32 is illustrated in FIG. 5. A push button or similar device 34 is mounted on the plate 32 by inserting the device through a clearance hole in the mounting plate and securing the device thereto by tightening down notched ring nut 16 against the surface of the plate 32.

Figure 6:
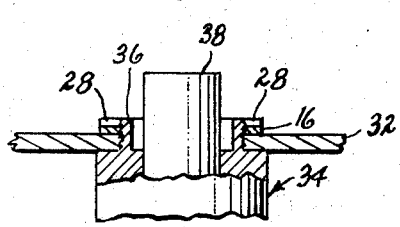
FIG. 6 is a section view taken along the lines 6—6 of FIG. 5 showing the cross section of the panel and push button device.
Figure 7:
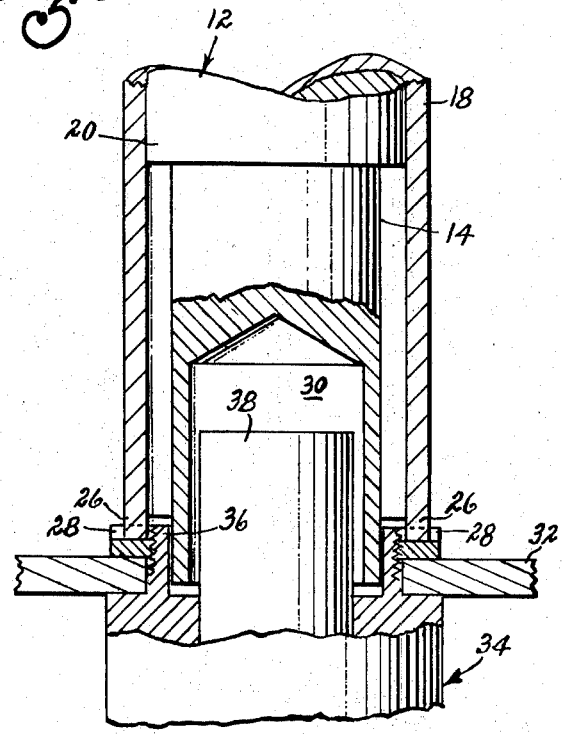
FIG. 7 is an enlarged view similar to FIG. 6 illustrating the engagement of the nut driver and the notched ring nut of the push button device.

A section view showing the push button or similar device 34 with respect to the mounting plate 32 is illustrated in FIG. 6. A hollow threaded shaft 36 is inserted through a clearance hole in the mounting plate 32. The slip ring 16 then fits over and in received by the hollow threaded shaft 36. By tightening down the ring 16 against the plate 32, the device 34 is mounted on the panel 32.

A typical engagement of the nut driver of the present invention and the device 34 is illustrated in detail in FIG. 7. The ears 26 are placed in notches 28 of the notched ring nut 16. The stepped shaft 14 then is designed to fit inside the ring 16 and inside the inner diameter of the hollow threaded shaft 36. Thus, lateral shifting of the driver is prevented as it is rotated to tighten the ring 16 against the plate 32. The clearance zone 30 of the stepped shaft 14 provides clearance for a push button 38 or similar internal interference of the device being tightened. Thus, utilization of the present invention permits tightening down of the slipped ring nut 16 against the panel 32, without internal interference from pushbutton 38, and without permitting lateral shift of the driver thereby preventing damage to the panel 32.

While particular embodiments of the invention have been herein disclosed, it should further be understood that changes in the exact structural details described will not depart from the intended scope and spirit of the appended claims.

What is claimed is:

1. A tool for driving a ring nut retainer having notches to secure push buttons and similar devices to panels, comprised in part of a first cylindrical shaft, a hollow cylinder attached to said first cylindrical shaft having ears on one end suited to engage the notches of said ring nut retainer, and a second cylindrical shaft placed inside said hollow cylinder, secured to said first cylindrical shaft, and having a diameter smaller than the internal diameter of the ring nut retainer and extending beyond said ears to minimize lateral slippage of the tool while engaging the ring nut retainer, wherein the improvement comprises a hollow clearance region on the nut engaging end of said second cylindrical shaft for receipt of the push buttons or other projections on the devices being mounted.

\* \* \* \* \*